(12) United States Patent
Tonami

(10) Patent No.: US 7,262,629 B2
(45) Date of Patent: Aug. 28, 2007

(54) APPARATUS AND METHOD FOR PROTECTING FROM ILLEGAL COPY

(75) Inventor: Masahiro Tonami, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 82 days.

(21) Appl. No.: 11/290,396

(22) Filed: Dec. 1, 2005

(65) Prior Publication Data

US 2006/0119378 A1 Jun. 8, 2006

(30) Foreign Application Priority Data

Dec. 2, 2004 (JP) ............... 2004-350284

(51) Int. Cl.
*H03K 19/00* (2006.01)
(52) U.S. Cl. ............... 326/8; 326/38; 713/100
(58) Field of Classification Search ............ 326/8, 326/37–41; 713/1, 2, 100
See application file for complete search history.

(56) References Cited

U.S. PATENT DOCUMENTS

| | | | | |
|---|---|---|---|---|
| 5,426,378 A | * | 6/1995 | Ong | 326/39 |
| 5,768,372 A | * | 6/1998 | Sung et al. | 713/193 |
| 5,970,142 A | * | 10/1999 | Erickson | 713/189 |
| 6,118,869 A | * | 9/2000 | Kelem et al. | 380/44 |
| 7,162,644 B1 | * | 1/2007 | Trimberger | 713/189 |
| 7,197,647 B1 | * | 3/2007 | Van Essen et al. | 713/189 |
| 2001/0037458 A1 | * | 11/2001 | Kean | 713/193 |
| 2006/0020907 A1 | * | 1/2006 | Tonami et al. | 717/100 |

FOREIGN PATENT DOCUMENTS

| JP | 2001-325153 A | 11/2001 |
|---|---|---|
| JP | 2003-84853 A | 3/2003 |

* cited by examiner

*Primary Examiner*—Don Le
(74) *Attorney, Agent, or Firm*—Sughrue Mion, PLLC

(57) ABSTRACT

A copy protection circuit to prevent illegal copy of a circuit configuration data when the user circuit data is read out and transferred from a storage device to a rewritable gate array (FPGA), includes a control circuit, a data generating circuit and a data switch circuit. The control circuit controls transfer of the circuit configuration data from the storage device to the FPGA, and the data generating circuit generates pseudo circuit configuration data. The data switch circuit transfers to the FPGA, the circuit configuration data read out from the storage circuit and the pseudo circuit configuration data outputted from the data generating circuit. The data switch circuit transfers to the FPGA the circuit configuration data which is less than a data amount that the FPGA needs, and then the pseudo circuit configuration data.

17 Claims, 6 Drawing Sheets

APPARATUS AND METHOD FOR PROTECTING FROM ILLEGAL COPY

BACKGROUND OF THE INVENTION

1. Field of the Invention

The present invention relates to a circuit and method for protecting circuit data of a programmable gate array from being copied.

2. Description of the Related Art

A gate array such as an FPGA (Field Programmable Gate Array), in which a circuit configuration is rewritable by a user, is adopted to develop devices in a short period of time and mass-produce them. A circuit data used for the configuration is often stored in a storage device such as a ROM (Read Only Memory), and the FPGA is provided with SRAM (Static Random Access Memory) cells as a program device. It is necessary to copy the circuit configuration data from the ROM into the SRAM cells for programming the FPGA at every start-up such as power-on. This is because a data held in the SRAM cells is erased on power-off. For this reason, the circuit configuration data is copied from the ROM into the SRAM cells. In this case, because the ROM can easily be copied by using a ROM writer, the circuit configuration data is subject to unauthorized copying. Parts such as the FPGA and the ROM are easily commercially available. That is, a device formed by the FPGA can be developed in a short period of time but has a risk that the device developed with great resources may easily be copied.

For this reason, various techniques are known for the copy protection of the device using the FPGA. A copy protection system for a programmable gate array is disclosed in Japanese Laid Open Patent Application (JP-P2003-84853A), which is composed of a logic circuit (CPLD) and a programmable gate array circuit (FPGA). The logic circuit (CPLD) is programmed in a factory, and has an initial-state generator, a first sequence generator, and an encoding circuit. The programmable gate array circuit (FPGA) is programmed. The FPGA has a second sequence generator, a third sequence generator, a decoding circuit, and a sequence comparing circuit. The second sequence generator is a replica of the first sequence generator. In this system, an initial state is generated by the initial state generator of the CPLD. The CPLD initializes the first sequence generator to the initial state. Then, the CPLD encodes the initial state by the encoding circuit, and transmits the encoded initial state to the FPGA. The FPGA decodes the encoded initial state by the decoding circuit. The FPGA initializes the second sequence generator to the initial state. The FPGA generates a call sequence by using the third sequence generator, and transmits a call sequence to the first sequence generator and the second sequence generator. The first sequence generator generates a first response sequence based on the initial state and the call sequence. The first sequence generator transmits a first response sequence to the sequence comparing circuit. The second sequence generator generates a second response sequence based on the initial state and the call sequence, and transmits the second response sequence to the sequence comparing circuit. The sequence comparing circuit compares the first and second response sequences. The sequence comparing circuit permits an operation of an FPGA program when the first and second response sequences are identical to each other. In this way, the copy-protection system for the programmable gate array prevents the illegal copying.

Also, a circuit data protecting method for a field programmable gate array provided with a volatile memory is disclosed in Japanese Laid Open Patent Application (JP-P2001-325153A). In this method, a nonvolatile memory is provided outside the field programmable gate array, as a means to write the circuit data into the field programmable gate array. Encoded circuit data has been written in the nonvolatile memory. At the time of power-on, the circuit data is written from the nonvolatile memory into the volatile memory provided to the field programmable gate array. The field programmable gate array decodes the encoded circuit data and writes the circuit data to the volatile memory. Thus, the circuit data is protected.

As described above, in these conventional examples, a copy of the circuit configuration data is prevented by using the ROM for storing the circuit configuration data for configuring the FPGA and giving a special function to the FPGA. For this reason, the conventional examples are not user-friendly.

SUMMARY OF THE INVENTION

In an aspect of the present invention, a copy protection circuit to prevent illegal copy of a circuit configuration data when the user circuit data is read out and transferred from a storage device to a rewritable gate array (FPGA), includes a control circuit, a data generating circuit and a data switch circuit. The control circuit controls transfer of the circuit configuration data from the storage device to the FPGA, and the data generating circuit generates pseudo circuit configuration data. The data switch circuit transfers to the FPGA, the circuit configuration data read out from the storage circuit and the pseudo circuit configuration data outputted from the data generating circuit. The data switch circuit transfers to the FPGA the circuit configuration data which is less than a data amount that the FPGA needs, and then the pseudo circuit configuration data.

Here, the data generating circuit may generate the pseudo circuit configuration data based on a preset data, or may generate the pseudo circuit configuration data based on a data that has been stored in the storage circuit. Also, the pseudo circuit configuration data may contain at least a part of the circuit configuration data.

Also, the storage device has stored the circuit configuration data which contains a first circuit configuration data and a second circuit configuration data. The switch circuit may transfer the first circuit configuration data read out from the storage device and then the pseudo circuit configuration data to the FPGA. The control circuit determines whether or not transfer of the second circuit configuration data to the FPGA is permitted, based on a confirmation signal outputted from a first circuit generated based on the first circuit configuration data set in the FPGA. then, the control circuit may control the switch circuit to transfer the second circuit configuration data read out from the storage circuit and then the pseudo circuit configuration data to the FPGA, based on the determination result. In this case, the copy protection circuit may further include a decoding circuit configured to decode the confirmation signal, the confirmation signal contains an encoded data; and a determining circuit configured to determine validity of the first circuit configuration data based on the decoded confirmation signal. The control circuit controls the switch to transfer the second circuit configuration data to the FPGA, when the determination result indicates validity.

Also, the circuit configuration data may contain a third circuit configuration data between the first circuit configuration data and the second circuit configuration data. The circuit data generating circuit may generate the pseudo circuit configuration data based on the third circuit configuration data.

Also, in another aspect of the present invention, a copy protection system includes a gate array (FPGA) that a circuit configuration is rewritable by a user; a storage device configured to store a plurality of circuit configuration data used to define the circuit configuration of the FPGA; and a copy protection circuit configured to transfer the plurality of circuit configuration data to the FPGA. The copy protection circuit includes a control circuit configured to control transfer of each of the plurality of circuit configuration data to the FPGA; and a data generating circuit configured to generate a pseudo circuit configuration data. The copy protection circuit determines whether to permit each of the plurality of circuit configuration data to be transferred to the FPGA, reads out each of the plurality of circuit configuration data from the storage device to transfer to the FPGA when the transfer is permit, and then transfers the pseudo circuit configuration data to the FPGA.

Here, a first one of the plurality of circuit configuration data may have a code string. The copy protection circuit may receive the code string from the FPGA after transferring the first circuit configuration data and the pseudo circuit configuration data to the FPGA, may determine validity of the first circuit configuration data based on the received code string, and may read out a second one of the plurality of circuit configuration data to transfer to the FPGA, when the validity is confirmed.

Also, the code string may be encoded and transmitted from the FPGA.

Also, the storage device may include a semiconductor storage device, or a gate array programmed by a semiconductor vender.

Also, in another aspect of the present invention, a method of preventing an illegal copy of a circuit configuration data for a gate array (FPGA) that a circuit configuration is rewritable by a user, is achieved by transferring a first one of a plurality of circuit configuration data stored in a storage device to the FPGA; by generating a pseudo circuit configuration data; by transferring the pseudo circuit configuration data to the FPGA after the circuit configuration data is transferred from the storage device to the FPGA; and by determining whether to transfer a second one of the plurality of circuit configuration data to the FPGA.

Here, when the first circuit configuration data contains a code string, the determining step may be achieved by confirming validity of the first circuit configuration data based on the code string which is outputted from a first circuit set in the FPGA based on the first circuit configuration data; and by transferring the second circuit configuration data to the FPGA when the validity is confirmed.

Also, the code string may be encoded and outputted from the first circuit.

Also, the generating may be achieved by generating the pseudo circuit configuration data based on a preset data, or by generating the pseudo circuit configuration data containing at least a part of the plurality of circuit configuration data.

DESCRIPTION OF THE PREFERRED EMBODIMENTS

Hereinafter, a copy protecting system of the present invention will be described in detail with reference to the attached drawings.

In the present invention, a start-up control circuit data is firstly transferred from a storage device to an FPGA. After the start-up control circuit data is transferred to the FPGA, an additional data is generated in a gate array, and the additional data is transferred to the FPGA. Consequently, the data is written into an entire an SRAM storage area in the FPGA. A start-up control circuit of the FPGA is started up, and validity of a system is confirmed. Subsequently, a user circuit data is transferred from the storage device to the FPGA. After the user circuit data is transferred to the FPGA, another additional data is generated in the gate array and is then be transferred to the FPGA, and the data is written into the entire SRAM storage area in the FPGA. Thus, the validity of the system can be confirmed, and the additional data does not need to have been stored in the storage device.

Figure 1:
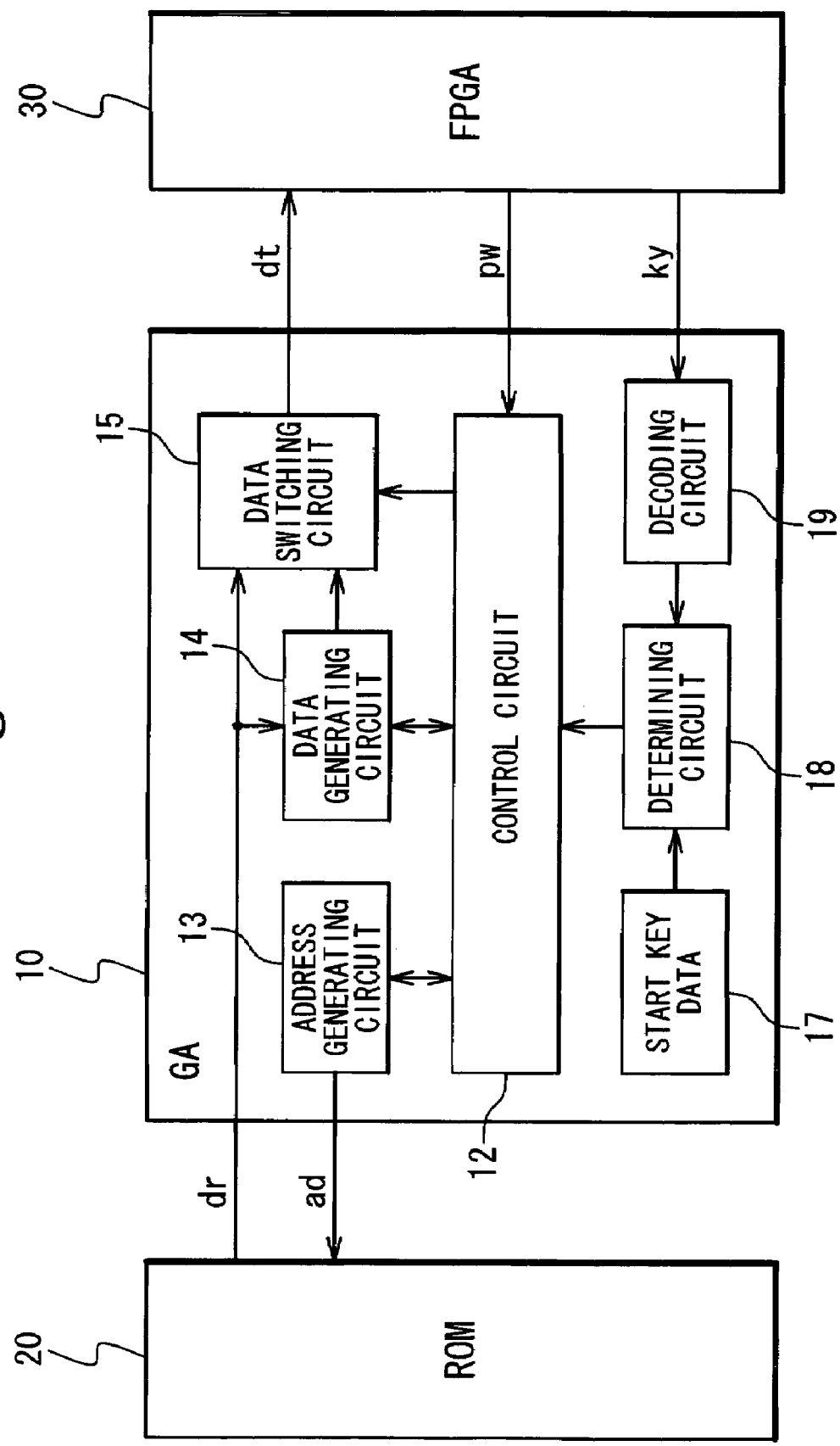
FIG. 1 is a block diagram showing a configuration of a FPGA programming system according to an embodiment of the present invention.

The copy protecting system according to an embodiment of the present invention will be described below with reference to FIGS. 1 to 4. FIG. 1 shows a configuration of a system for programming a programmable gate array (FPGA: Field Programmable Gate Array).

The FPGA programming system has an FPGA 30 in which a circuit defined by a user is programmed; a ROM 20 as a storage device which stores a circuit data to be set in the FPGA 30; and a gate array (GA) 10 for reading the circuit data from the ROM 20 and writing the read circuit data into the FPGA 30.

The FPGA 30 is provided with SRAM (Static Random Access Memory) as a program device. The FPGA 30 holds the circuit data in the storage area of the SRAM, and achieves a circuit operation set based on the circuit data. The circuit data is written into the SRAM from outside at the time of power-on of the FPGA programming system and so on. Usually, unless the circuit data for a storage capacitance of the SRAM is written, a start-up of a circuit cannot be carried out. That is, it is necessary to write the circuit data for the storage capacitance of the SRAM into the SRAM.

Figure 2:
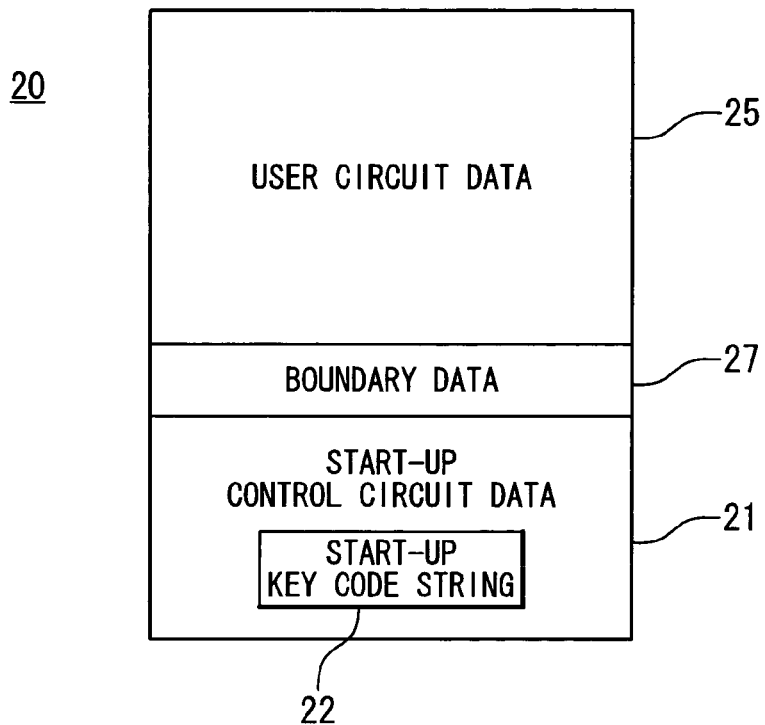
FIG. 2 is a diagram showing a circuit data stored in a ROM used in the embodiment of the present invention.

In the ROM 20, the circuit data to be set in the FPGA 30 has been stored. The circuit data is also referred to as an FPGA program. As shown in FIG. 2, the ROM 20 stores a start-up control circuit data 21 and a user circuit data 25. The start-up control circuit data 21 is a circuit configuration data for a start-up control circuit 31 that should be set to the FPGA 30 firstly after the power-on. The start-up control circuit 31 operates, and confirms the validity of the FPGA programming system. The start-up control circuit data 21 contains a start-up key code string 22. On the other hand, the user circuit data 25 is a circuit configuration data for a circuit developed and designed by the user. Therefore, a data amount of the user circuit data 25 and functions thereof vary according to the user-designed circuit. Only valid circuit data of each of the start-up control circuit data 21 and the user circuit data 25 are stored in the ROM 20. Therefore, the start-up control circuit data 21 or the user circuit data 25 alone cannot satisfy the storage capacitance of the SRAM in the FPGA 30. Also, a boundary data 27 may be further stored between the start-up control circuit data 21 and the user circuit data 25. The boundary data 27 is not necessarily required. Also, the boundary data 27 may not be a data for setting a valid circuit as the circuit data of the FPGA 30.

In this way, it becomes difficult to read and analyze the contents of the ROM 20 and extract only the user circuit data 25, by providing the boundary data 27 between the start-up control circuit data 21 and the user circuit data 25, or by continuously arranging the start-up control circuit data 21 and the user circuit data 25.

The gate array 10 is provided with a control circuit 12, an address generating circuit 13, a data generating circuit 14, a data switching circuit 15, a start-up key data 17, a determining circuit 18, and a decoding circuit 19.

The control circuit 12 controls each of the circuits incorporated into the gate array 10, and controls transfer of the circuit data from the ROM 20 to the FPGA 30. The address generating circuit 13 generates an address of the ROM 20 in response to an instruction from the control circuit 12, and supplies the generated address ad to the ROM 20. The data generating circuit 14 generates a pseudo circuit data in response to an instruction from the control circuit 12, and supplies the generated pseudo circuit data to the data switching circuit 15. The pseudo circuit data generated by the data generating circuit 14 may be a preset data, or may be generated based on the data read out from the ROM 20. In response to an instruction of the control circuit 12, the data switching circuit 15 selects a data to be outputted, from the data dr read out from the ROM 20 and the data outputted from the data generating circuit 14, and outputs the selected data to the FPGA 30. The start-up key data 17 holds a data of a start-up key for confirming the validity of the FPGA programming system, and is supplied to the determining circuit 18. The decoding circuit 19 decodes the encoded start-up key code string outputted from the FPGA 30, and supplies the decoded start-up key code string to the determining circuit 18. The determining circuit 18 compares the start-up key data 17 and the decoded start-up key code string from the decoding circuit 19, and checks whether the both are coincident with each other. The determining result is outputted to the control circuit 12.

Figure 7:
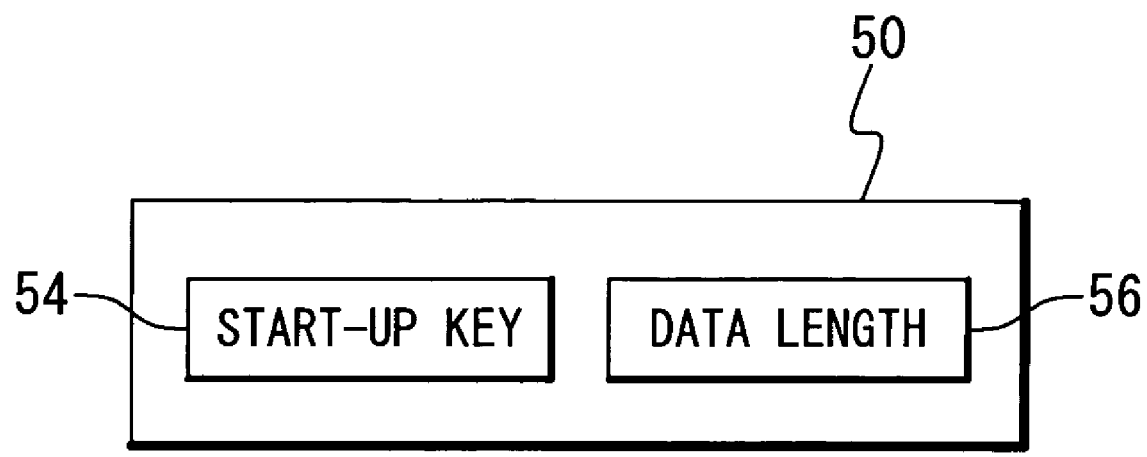
FIG. 7 is a diagram showing a start-up key contained in a start-up key code string.

Next, the start-up key code string used to confirm the validity of the FPGA programming system will be described. FIG. 7 shows a configuration of the start-up key code string ky 50 transmitted to confirm the validity of the FPGA programming system. The start-up key code string ky 50 contains a start-up key 54 and a data length 56. The start-up key 54 is a preset data, and is given fixedly for every designed circuit. The start-up key 54 is stored in the gate array 10 as the start-up key data 17, and is used to confirm the validity of the FPGA programming system. The data length 56 shows a data amount of the user circuit data 25.

Of the start-up key code string 50, the start-up key 54 is encoded at least. The encoding method may be a private-key encoding method or a public-key encoding method. In general, the load of a decoding process is lighter in the private-key encoding method and a circuit scale is smaller, compared with the public-key encoding method. It is better to use the public-key encoding method when protecting the start-up key more strictly.

Also, the start-up key 54 and the data length 56 may be encoded and transmitted and the encoded data may be transmitted with an encoded data. In this case, it is possible to reduce a risk of data leakage during transmission, during which observation is possible from outside.

In addition, the data length 56 can be determined when the user circuit data 25 is stored. Therefore, the data length 56 may be stored previously in the gate array 10 without being recorded in the ROM 20 as the start-up key code string 22. In that case, the data length 56 is not transferred between the gate array 10 and the FPGA 30. Therefore, the observation and the data leakage at the time of the transmission do not occur.

Further, the start-up key code string 22 may also be incorporated in the start-up control circuit data 21 without being encoded. In that case, an encoding circuit is incorporated into the start-up control circuit 31, and a start-up key code string 32 is encoded to be transferred to the gate array 10. Owing to the encoding, the observation and the data leakage at the time of the transmission do not occur.

Next, an operation of the FPGA programming system for the copy protection configured as mentioned above will be described below. First, the entire operation of the gate array 10 will be described, with reference to a flow chart shown in FIG. 4. Here, the operation will be described as the operation at the time of power-on of the FPGA programming system. However, a sequence described below may be carried out at any time when initialization of the FPGA programming system is necessary.

The FPGA 30 generates a power-on detection signal if detecting the power-on, and notifies to an external unit that the reception of the circuit data is possible. Thus, the FPGA 30 enters a circuit data reception mode. On the other hand, after the power-on, the gate array 10 waits until receiving the power-on detection signal outputted from the FPGA 30 (step S41).

When the power-on detection signal is received and the FPGA 30 enters the circuit data reception mode (step S41-YES), the gate array 10 instructs the FPGA 30 to erase the circuit data set in the SRAM of the FPGA 30 (step S42). This step is not necessary immediately after the power-on, if the contents of the SRAM of the FPGA 30 are all erased. However, this step is usually carried out at the time of initial setting and so on, besides the power-on. Additionally, this step is not necessary in case of the FPGA that automatically erases the circuit data stored in the SRAM when the circuit data reception mode is set.

If the erasing of the circuit data in the SRAM of the FPGA 30 is completed, the gate array 10 reads the start-up control circuit data 21 from the ROM 20, and transfers the read data to the FPGA 30 in order. Thus, the transferred data is written into the SRAM (step S43). A procedure of this step is described in detail later.

Figure 3A:
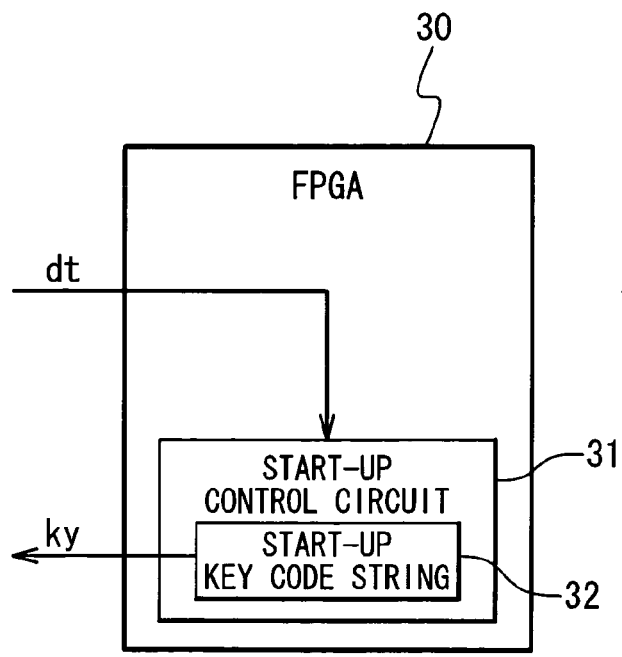
FIGS. 3A and 3B are diagrams showing a state that the circuit data is set in the FPGA in the embodiment of the present invention.

The start-up control circuit data 21 is transferred to the SRAM of the FPGA 30, and is set in the FPGA 30, as shown in FIG. 3A. Thus, the start-up control circuit 31 is configured and the start-up key code string 22 having been stored in the ROM 20 is set as the start-up key code string 32 as it is. Then, the FPGA 30 starts up the start-up control circuit 31 (step S45).

The start-up control circuit 31, if started, transfers the start-up key code string 32 incorporated therein, to the gate array 10 as the start-up key code string ky. At this time, the start-up control circuit 31 outputs the start-up key code string 32 with no change. It is preferable that the start-up key code string 32 is encoded by the start-up control circuit 31, when the start-up key code string 32 is transferred to the gate array 10. If the start-up key code string 32 is encoded by the start-up control circuit 31, a value different from the start-up key code string 22 stored in the ROM 20 is generated. Consequently, a higher secrecy can be obtained.

The start-up key code string 32 is transferred from the start-up control circuit 31 to the gate array 10, as the start-up key code string ky. The start-up key code string ky 50 contains the start-up key 54 and the data length 56, as shown in FIG. 7. The data length 56 does not need to be transferred when the data length 56 is set previously in the gate array 10.

The gate array 10 receives the start-up key code string ky transferred from the start-up control circuit 31 (step S47). The gate array 10 decodes the encoded start-up key code string ky by the decoding circuit 19, and takes out the start-up key code string (step S48). The decoded start-up key code string is compared with the start-up key data 17 by the determining circuit 18, and the validity of the FPGA programming system is confirmed (step S51).

If the determining circuit 18 determines that the decoded start-up key code string is not valid (step S51-NG), the transfer of the user circuit data is not carried out and an FPGA start-up sequence is ended. That is, the user circuit data 25 is not transferred from the ROM 20 to the FPGA 30. In other words, the user circuit data 25 for carrying out a desired operation cannot be set to the FPGA 30. Additionally, the circuit data stored in the FPGA 30 may be erased.

If the determining circuit 18 determines that the start-up key code string is valid (step S51-OK), the gate array 10 begins a transfer sequence of the user circuit data 25. Since the circuit data of the start-up control circuit has been set in the SRAM of the FPGA 30, the circuit data of the SRAM is firstly erased (step S52).

Figure 3B:
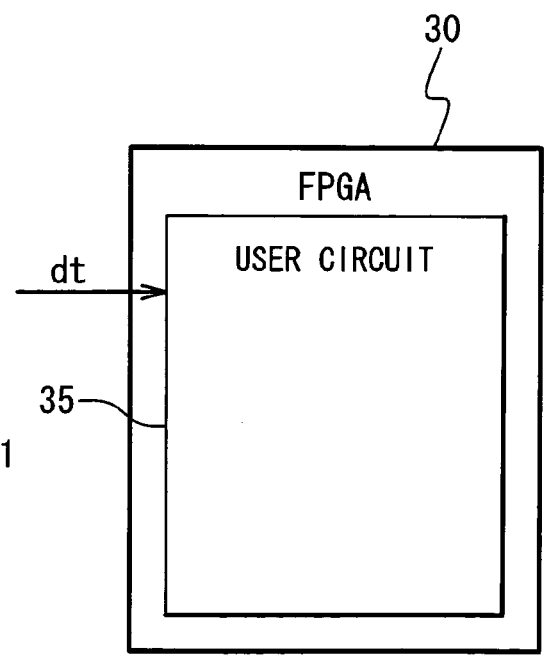
Figure 4:
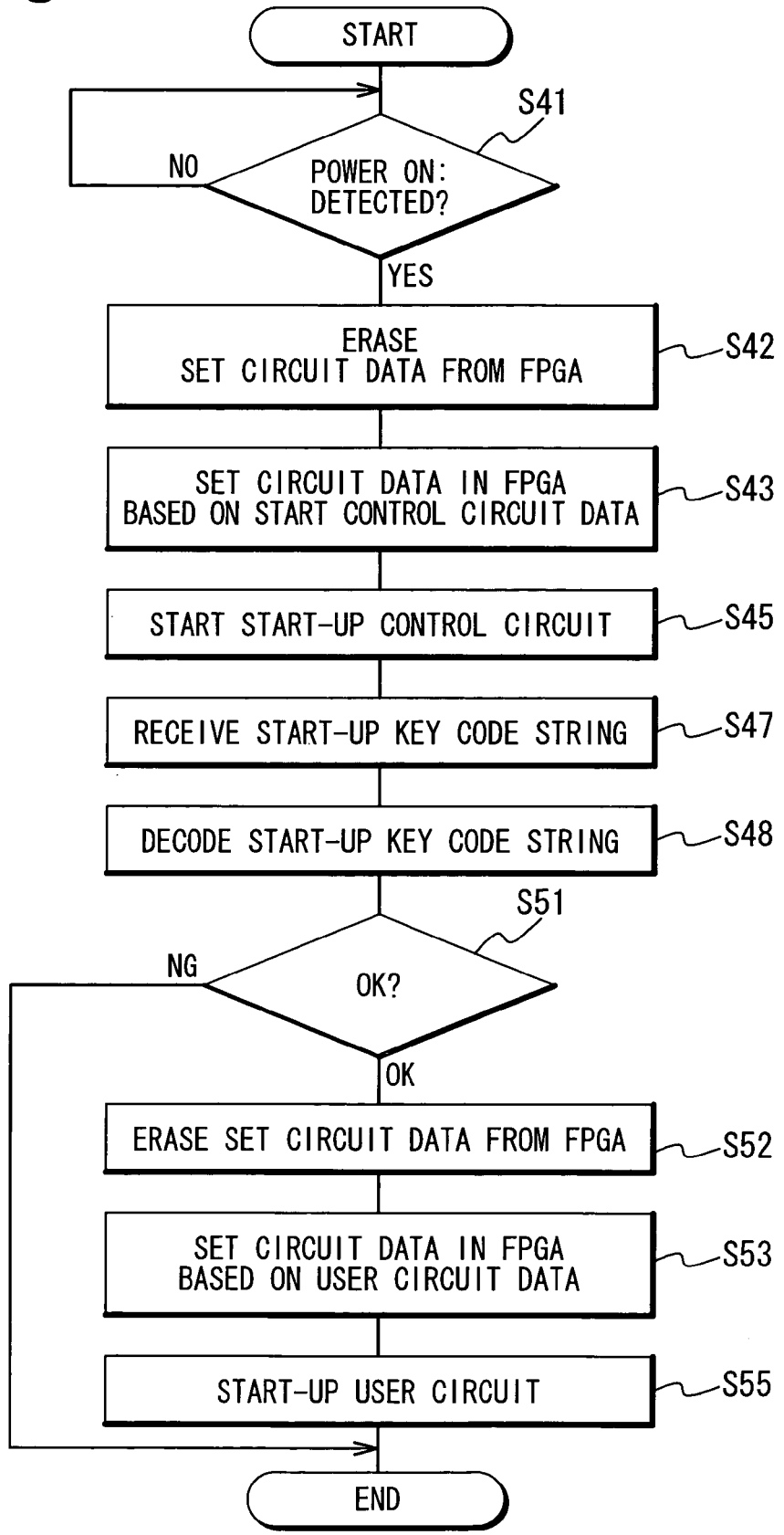
FIG. 4 is a flow chart showing an operation when the FPGA is programmed.

When the circuit data of the SRAM is erased, the gate array 10 transfers the user circuit data 25 of the ROM 20 to the FPGA 30 (step S53). After the user circuit data 25 is all transferred to the FPGA 30, a user circuit 35 is set to the FPGA 30 in place of the start-up control circuit 31, as shown in FIG. 3B. The gate array 10 starts a user circuit 35 based on the user circuit data set in the FPGA 30, and the FPGA 30 carries out the circuit operation designed by the user.

In this way, it is impossible to transfer the user circuit data 25 to the FPGA 30 without the gate array 10. Therefore, it is impossible to achieve the system function, unless the gate array 10 is owned. Therefore, the copying of the circuit data can be prevented.

Figure 5:
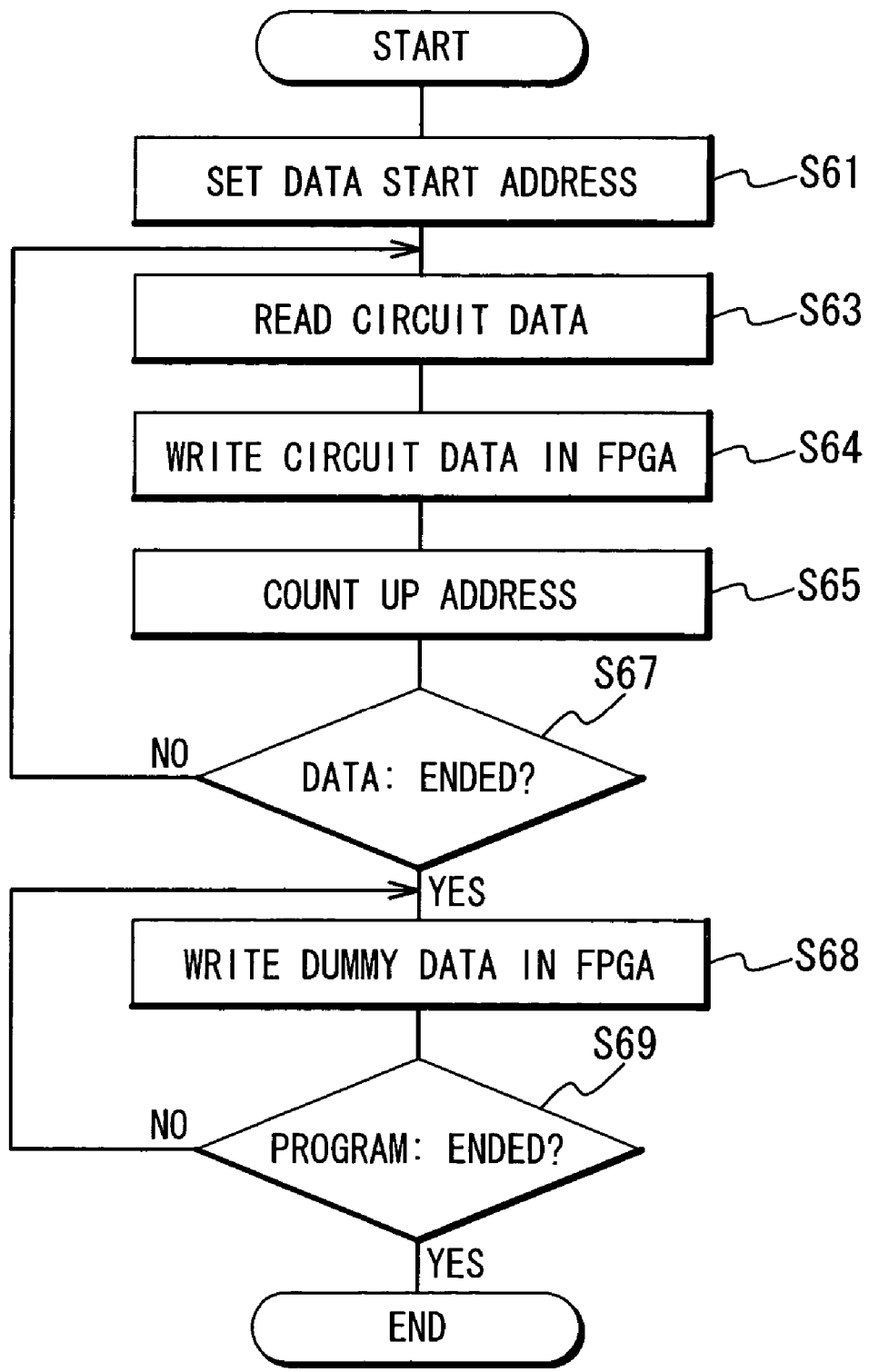
FIG. 5 is a flow chart showing an operation when the circuit data is read out from the ROM and transferred to the FPGA.

The transfer operation of the start-up control circuit data and the user circuit data mentioned above will be described. FIG. 5 is a flow chart showing the operation of the gate array 10 for reading the start-up control circuit data and the user circuit data from the ROM 20, and transferring the read start-up control circuit data and user circuit data to the FPGA 30.

The control circuit 12 sets a start address of the ROM 20 in which the circuit data is stored, to the address generating circuit 13 (step S61). In case of the start-up control circuit data, it is preferable that the start address is closer to a head address of the ROM 20 than the user circuit data. The address ad of the ROM 20 is outputted from the address generating circuit 13. The ROM 20 outputs data from the address location specified by the address ad. The gate array 10 receives the circuit data dr (step S63).

The data switching circuit 15 is controlled to select the data read from the ROM 20 by the control circuit 12. The circuit data supplied to the gate array 10 is transferred to the FPGA 30 through the data switching circuit 15. A transferred circuit data dt is stored in the SRAM of the FPGA 30 (step S64).

When the circuit data is transferred to the FPGA 30, the address generating circuit 13 counts up the readout address, to instruct the ROM 20 to output the next data (step S65).

The steps S63 to S65 are repeated until the readout address exceeds a range of the circuit data (steps S67-NO). Here, the end of a valid data is determined by detecting that the readout address is a last address of the circuit data. The determination of the end of the valid data may be carried out by entering a special data (pattern) to the circuit data and by detecting that special data. Also, the determination may be carried out by detecting that the transfer of the circuit data is completed so that the data is not outputted. Further, since the data amount of the circuit data is known previously based on the data length 56, the determination may be carried out by counting the data amount by a counter and so on.

When the readout address exceeds the range of the circuit data (step S67-YES), the control circuit 12 stops reading the circuit data from the ROM 20, and sets the data switching circuit 15 to the side of the data generating circuit 14.

The data generating circuit 14 generates a meaningless data (such as a dummy data of all zeros and so on, which does not affect other circuits), and transfers the meaningless data to the FPGA 30 through the data switching circuit 15. The FPGA 30 stores the meaningless data (dummy data) in the SRAM (step S68). A data pattern may be set previously for the meaningless data (dummy data), or the data set in the ROM 20 may be used as the meaningless data (dummy data). Also, any circuit data stored in the ROM 20 may be used.

Until the data for the storage capacitance of the SRAM of the FPGA 30 is transferred, the data generating circuit 14 generates the meaningless data (dummy data) and transfers the generated meaningless data (dummy data) to the FPGA 30 (step S69-NO).

If the data is stored in the entire SRAM of the FPGA 30, the configuration (writing) of the FPGA 30 is ended (step S69). The termination of the circuit data transfer to the FPGA 30 is determined based on a count value of a data amount generated by the data generating circuit 14, the count value of a transfer number by the data switching circuit 15, or the like.

In this way, the gate array 10 transfers the circuit data from the ROM 20 to the FPGA 30. Although the address of the circuit data stored in the ROM 20 is different, the circuit data is transferred with the same procedure in both cases of the start-up control circuit and the user circuit data. Since the data generating circuit 14 generates the dummy data as padding data of the circuit data stored in the ROM 20, the data stored in the ROM 20 may be only the circuit data valid for a circuit configuration, and the ROM capacitance can be reduced.

Figure 6:
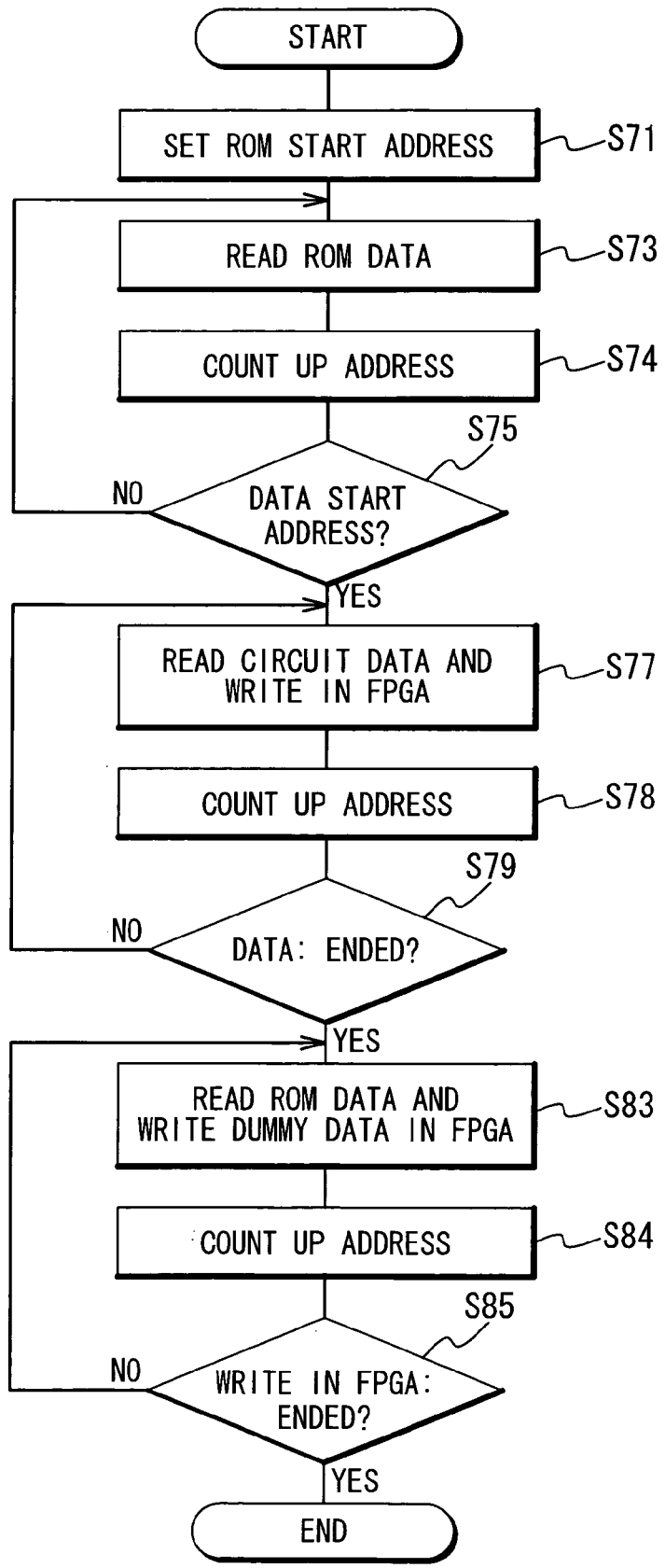
FIG. 6 is a flow chart showing another operation when the circuit data is read out from the ROM and transferred to the FPGA.

Next, a modification of the transfer operation of the circuit data will be described with reference to FIG. 6. FIG. 6 is a flow chart showing the operation of the gate array 10, in which the address is outputted to the ROM 20 in the same way in the start-up control circuit data and the user circuit data, and the start-up control circuit data and the user circuit data are transferred from the ROM 20 to the FPGA 30.

The control circuit 12 sets the start address of the ROM 20 to the address generating circuit 13 (step S71). In case of a single ROM, the start address of the ROM 20 is usually "0". The same address is set as the start address of the ROM 20 in both cases of the start-up control circuit data and the user circuit data.

The data read from the ROM 20 up to a position where the start-up control circuit data or the user circuit data is stored from the start address of the ROM 20, is discarded. That is, the ROM 20 outputs the circuit data dr in response to the address outputted from the address generating circuit 13. The gate array 10 reads the circuit data outputted from the ROM 20 (step S73). The address generating circuit 13 counts up the address in response to the instruction of the control circuit 12 (step S74). The control circuit 12 determines whether the address is the start address of the valid circuit data (step S75). The gate array 10 repeats steps S73 to S75 until the start address of the valid circuit data is identified (step S75-NO).

When the address outputted to the ROM 20 is identified as the address of the valid circuit data (step S75-YES), the circuit data is read out from the ROM 20 and transferred to the FPGA 30 by the gate array 10. That is, the ROM 20 outputs the circuit data in response to the address outputted from the address generating circuit 13. The outputted circuit data is transferred to the FPGA 30 through the data switching circuit 15. Thus, the circuit data is stored in the SRAM (step S77). At this time, the data switching circuit 15 is set to select the data read from the ROM 20 by the control circuit 12. In order to read the next circuit data, the address generating circuit 13 counts up the address in response to the instruction of the control circuit 12 (step S78). The gate array 10 repeats steps S77 to S79 until the address exceeds the range of the valid circuit data (step S79-NO).

When the address exceeds the range of the valid circuit data (step S79-YES), the valid circuit data to be transferred to the FPGA 30 does not remain in the ROM 20. Therefore, the gate array 10 transfers the meaningless data (which does not affect other circuits) to the FPGA 30 hereinafter such that the SRAM of the FPGA 30 is filled. On the other hand, the gate array 10 supplies the address to the ROM 20, and operates to read the circuit data from the ROM 20. That is, the control circuit 12 sets the data switching circuit 15 such that the data transferred to the FPGA 30 is selected from the data generating circuit 14. The data generating circuit 14 generates the meaningless data (which does not affect other circuits), and transfers the generated meaningless data to the FPGA 30 through the data switching circuit 15. The FPGA 30 stores the meaningless data (dummy data) in the SRAM (step S83). On the other hand, if the address is supplied to the ROM 20 and the dummy data is transferred to the FPGA 30, the address generating circuit 13 counts up the address in response to the instruction from the control circuit 12 (step S84). The steps S83 to S85 are repeated until the data for the storage capacitance of the SRAM of the FPGA 30 is transferred (step S85-NO).

If the data is stored in the entire SRAM area of the FPGA 30 (step S85-YES), a program (writing) of the FPGA 30 is ended. At this time, the address generating circuit 13 may continue to generate the address up to the final address of the ROM 20.

In this way, it is possible to transfer the circuit data without changing the address of the ROM 20 in the transfer of the start-up control circuit data and the user circuit data. Additionally, the dummy data to be transferred to the FPGA 30 is generated in the data generating circuit 14 in the above description. However, the circuit data read from the ROM 20 (the data read and discarded in the above description) may also be used. In that case, since the dummy data is the circuit data, mere observation from outside does not make it possible to distinguish the valid circuit data from an invalid circuit data. Also, when a personal computer and so on is used for a storage unit for storing the circuit data, it is preferable that the circuit data for the start address to the end address is transferred to the gate array 10 since the circuit data is managed in a form of a file.

Additionally, in the embodiment, the address generating circuit 13 is described to count up each time the data is received from the set address under the assumption that a storage device for storing the circuit data is the ROM. In case of a circuit or a device that outputs the circuit data in response to a trigger, the address generating circuit 13 may provide a signal as the trigger instead of the address.

Also, it is possible to store the start-up control circuit data in an unused area other than the ROM area for storing the user circuit data and an area prepared only to write the meaningless data into the SRAM of the FPGA. In this case, it is not necessary to change the storage capacitance of the ROM even when the start-up control circuit data is needed. That is, costs of the ROM for storing the circuit data can be reduced.

Also, even in a system using a generalized FPGA without providing a special function to the FPGA, and using a generalized ROM without providing a special function to the ROM, the unauthorized copying of the circuit data can be prevented.

Also, according to the present invention, a storage capacitance of a storage device for storing a user circuit data can be reduced. Therefore, cost reduction is possible.

What is claimed is:

1. A copy protection circuit to prevent illegal copy of a circuit configuration data when the user circuit data is read out and transferred from a storage device to a rewritable gate array (FPGA), comprising:
    a control circuit configured to control transfer of said circuit configuration data from said storage device to said FPGA;
    a data generating circuit configured to generate pseudo circuit configuration data; and
    a data switch circuit configured to transfer to said FPGA, said circuit configuration data read out from said storage circuit and said pseudo circuit configuration data outputted from said data generating circuit,
    wherein said data switch circuit transfers to said FPGA said circuit configuration data which is less than a data amount that said FPGA needs, and then said pseudo circuit configuration data.

2. The copy protection circuit according to claim 1, wherein said data generating circuit generates said pseudo circuit configuration data based on a preset data.

3. The copy protection circuit according to claim 1, wherein said data generating circuit generates said pseudo circuit configuration data based on a data that has been stored in said storage circuit.

4. The copy protection circuit according to claim 1, wherein said pseudo circuit configuration data contains at least a part of said circuit configuration data.

5. The copy protection circuit according to claim 1, wherein said storage device has stored said circuit configuration data which contains a first circuit configuration data and a second circuit configuration data,
    said switch circuit transfers said first circuit configuration data read out from said storage device and then said pseudo circuit configuration data to said FPGA,
    said control circuit determines whether or not transfer of said second configuration data to said FPGA is permitted, based on a confirmation signal outputted from a first circuit generated based on said first circuit configuration data set in said FPGA, and said control circuit controls said switch circuit to transfer said second circuit configuration data read out from said storage circuit and then said pseudo circuit configuration data to said FPGA, based on the determination result.

6. The copy protection circuit according to claim 5, further comprising:

a decoding circuit configured to decode said confirmation signal, said confirmation signal contains an encoded data; and a determining circuit configured to determine validity of said first circuit configuration data based on the decoded confirmation signal, wherein said control circuit controls said switch to transfer said second circuit configuration data to said FPGA, when the determination result indicates validity.

7. The copy protection circuit according to claim 5, wherein said circuit configuration data contains a third circuit configuration data between said first circuit configuration data and said second circuit configuration data, and said circuit data generating circuit generates said pseudo circuit configuration data based on said third circuit configuration data.

8. A copy protection system comprising:

a gate array (FPGA) that a circuit configuration is rewritable by a user;

a storage device configured to store a plurality of circuit configuration data used to define the circuit configuration of said FPGA; and a copy protection circuit configured to transfer said plurality of circuit configuration data to said FPGA, wherein said copy protection circuit comprises:

a control circuit configured to control transfer of each of said plurality of circuit configuration data to said FPGA; and a data generating circuit configured to generate a pseudo circuit configuration data, and said copy protection circuit determines whether to permit each of said plurality of circuit configuration data to be transferred to said FPGA, reads out each of said plurality of circuit configuration data from said storage device to transfer to said FPGA when the transfer is permit, and then transfers said pseudo circuit configuration data to said FPGA.

9. The copy protection system according to claim 8, wherein a first one of said plurality of circuit configuration data has a code string, said copy protection circuit:

receives said code string from said FPGA after transferring said first circuit configuration data and said pseudo circuit configuration data to said FPGA, determines validity of said first circuit configuration data based on the received code string, and reads out a second one of said plurality of circuit configuration data to transfer to said FPGA, when the validity is confirmed.

10. The copy protection system according to claim 9, wherein said code string is encoded and transmitted from said FPGA.

11. The copy prevention system according to claim 8, wherein said storage device comprises a semiconductor storage device.

12. The copy protection system according to claim 8, wherein said copy protection circuit comprises a gate array programmed by a semiconductor vender.

13. A method of preventing an illegal copy of a circuit configuration data for a gate array (FPGA) that a circuit configuration is rewritable by a user, comprising:

transferring a first one of a plurality of circuit configuration data stored in a storage device to said FPGA;

generating a pseudo circuit configuration data;

transferring said pseudo circuit configuration data to said FPGA after said circuit configuration data is transferred from said storage device to said FPGA; and determining whether to transfer a second one of said plurality of circuit configuration data to said FPGA.

14. The copy protecting method according to claim 13, wherein said first circuit configuration data contains a code string, said determining comprises:

confirming validity of said first circuit configuration data based on said code string which is outputted from a first circuit set in said FPGA based on said first circuit configuration data; and transferring said second circuit configuration data to said FPGA when the validity is confirmed.

15. The copy protecting method according to claim 14, wherein said code string is encoded and outputted from said first circuit.

16. The copy protecting method according to claim 13, wherein said generating comprises:

generating said pseudo circuit configuration data based on a preset data.

17. The copy protecting method according to claim 13, wherein said generating comprises:

generating said pseudo circuit configuration data containing at least a part of said plurality of circuit configuration data.

* * * * *